US006003195A

United States Patent [19]

Whitney

[11] Patent Number: 6,003,195

[45] Date of Patent: Dec. 21, 1999

[54] VACUUM GENERATION DEVICE

[75] Inventor: James C. Whitney, Norwalk, Conn.

[73] Assignee: Woodland Power Products, Inc., West Haven, Conn.

[21] Appl. No.: 08/982,742

[22] Filed: Dec. 2, 1997

[51] Int. Cl.[6] ................................ A47L 9/02; B60P 1/04; B65F 3/00

[52] U.S. Cl. ........................ 15/314; 15/340.1; 416/241 A

[58] Field of Search .................................. 15/314, 340.1, 15/340.3, 347; 406/39, 41, 100, 101, 102; 416/240, 241 A

[56] References Cited

U.S. PATENT DOCUMENTS

| | | | |
|---|---|---|---|
| 1,277,901 | 9/1918 | Gabel et al. . | |
| 2,782,722 | 2/1957 | Chubbuck | 416/241 A |
| 2,803,847 | 8/1957 | Hobbs | 15/314 |
| 3,665,545 | 5/1972 | Beekman | 15/340.1 |
| 3,778,865 | 12/1973 | Schmidt et al. | 15/340.1 |
| 4,567,623 | 2/1986 | Walton | 15/340.1 |
| 4,755,105 | 7/1988 | Blakeslee | 416/240 |
| 5,064,315 | 11/1991 | Samejima et al. | 406/100 |
| 5,226,757 | 7/1993 | Tarrant | 15/340.1 |
| 5,584,656 | 12/1996 | Rose | 416/240 |

OTHER PUBLICATIONS

Trac Vac Residential Lawn Care Equipment Brochure (6 pages) (No date).

Easy Vac™ Lawn Vacuums/EasyRake™ Powered Lawn Tools Brochure (6 pages) (No date).

*Primary Examiner*—Terrence R. Till

*Attorney, Agent, or Firm*—Ware Fressola Van Der Sluys & Adolphson LLP

[57] ABSTRACT

A device for vacuuming organic materal, comprising an impeller constructed from an elastomer such as polyurethane and shaped so that at operating speeds, the impeller deforms under the centripetal forces into a shape commonly found in such devices having rigid impellers. In an alternative embodiment, the device further comprises a housing and an outlet duct constructed from high density polyethylene. The outlet duct may be directed in at least two directions. In yet another alternative embodiment, the device further comprises a vacuum wand having a flared entrance and may have a riser section which is preferably 18 inches long.

21 Claims, 7 Drawing Sheets

VACUUM GENERATION DEVICE

BACKGROUND OF THE INVENTION

1. Field of the Invention

The present invention relates generally to devices used to generate a vacuum, and in particular to devices used to vacuum organic material such as leaves, cut grass, small sticks, pine needles, wood chips, nuts and other agricultural produce (hereinafter referred to as "organic material").

2. Description of the Prior Art

In order to vacuum organic material from an area, an impeller is disposed within a housing, an inlet duct is connected to the housing near the low pressure side of the impeller, and an outlet duct is connected to the housing near the high pressure side of the impeller. The impeller is normally driven via a drive shaft by a motor such that a vacuum is created in the inlet duct and a positive pressure is generated in the outlet duct. Organic material to be removed from an area is sucked into the inlet duct, moves through the housing, and then to the outlet duct where the organic material is blown by the impeller normally, but not always, to a container. When vacuuming organic material from an area, unwanted hard objects such as rocks and large sticks (hereinafter referred to as "hard objects") are often sucked along with the organic material into the inlet duct.

In the prior art devices used to vacuum organic material, impellers are rigid since they are generally made from metal or inflexible plastic. The hard objects sucked into the inlet duct often impact the impeller at a velocity high enough to damage the impeller and/or drive shaft, or the hard objects are wedged between the rigid impeller and the housing, which can cause damage to the impeller, motor, drive shaft, and housing.

The metallic prior art impellers are heavy. This results in a need for proper dynamic balancing of the impeller. Impacting the impeller with hard objects or wedging hard objects between the housing and the impeller can cause the impeller to go out of balance, thereby increasing operation costs due to lost time and costs associated with replacing or rebalancing the impeller. The weight of the prior art impellers also necessitates strong (and therefore heavy) support structures.

Furthermore, to reduce the chance that hard objects will become wedged between the housing and the impeller, the prior art devices sometimes provide a large clearance space between the housing and the tips of the impeller blades. Such a space results in generating less vacuum than could be generated with a smaller space between the housing and the impeller.

Also in the prior art, it is difficult to alter the direction in which the outlet duct directs the organic material. If it is desired to blow the organic material in a different direction, either (1) another duct must be attached to the outlet duct, or (2) several nut/bolt assemblies must be removed, the duct turned and the nut/bolt assemblies reinstalled. Either of these means of changing the direction in which the organic material is blown is time consuming and cumbersome.

Finally, in the prior art, a hand-held tube is provided for connecting to the inlet duct. These hand-held tubes are usually simple tubes having an external collar with handles so that the end of the tube can be positioned near the organic material by an operator. The entrances of these hand-held tubes are prone to plugging by sticks or other material caught on the entrance edge. Furthermore, a straight edge entrance results in significant loss of vacuum. In addition, to properly position the entrance of a prior art hand-held tube near organic material, the user is often required to bend downward, thereby causing back strain.

SUMMARY OF THE INVENTION

Accordingly, it is an object of the present invention to provide a device which will reduce the probability that hard objects, sucked into a vacuum device, will damage the impeller, housing, drive shaft or motor.

Another object of the present invention is to provide a device which is less likely need balancing than prior art devices.

Yet another object of the present invention is to reduce the weight of a vacuum generation device used to vacuum organic material.

Still another object of the present invention is to improve vacuum performance by reducing the clearance space between the impeller blade tips and the housing.

It is a further object of the present invention to provide an easier means for changing the direction in which organic material is blown.

Further objects include reducing the effort required to properly position a hand-held extension of the inlet tube; reducing the chance that sticks will become caught on the entrance of the hand-held extension of the inlet tube; and reducing the loss of vacuum associated with prior art hand-held tubes.

The foregoing objectives are realized, at least in part, by the present invention which comprises an impeller, a housing, an inlet duct, and an outlet duct.

Other objects and advantages of the present invention will become apparent to those skilled in the art from the following detailed description read in conjunction with the attached drawings and claims appended hereto.

BRIEF DESCRIPTION OF THE DRAWINGS

The drawings, not drawn to scale, include.

DETAILED DESCRIPTION OF THE INVENTION

Figure 1:
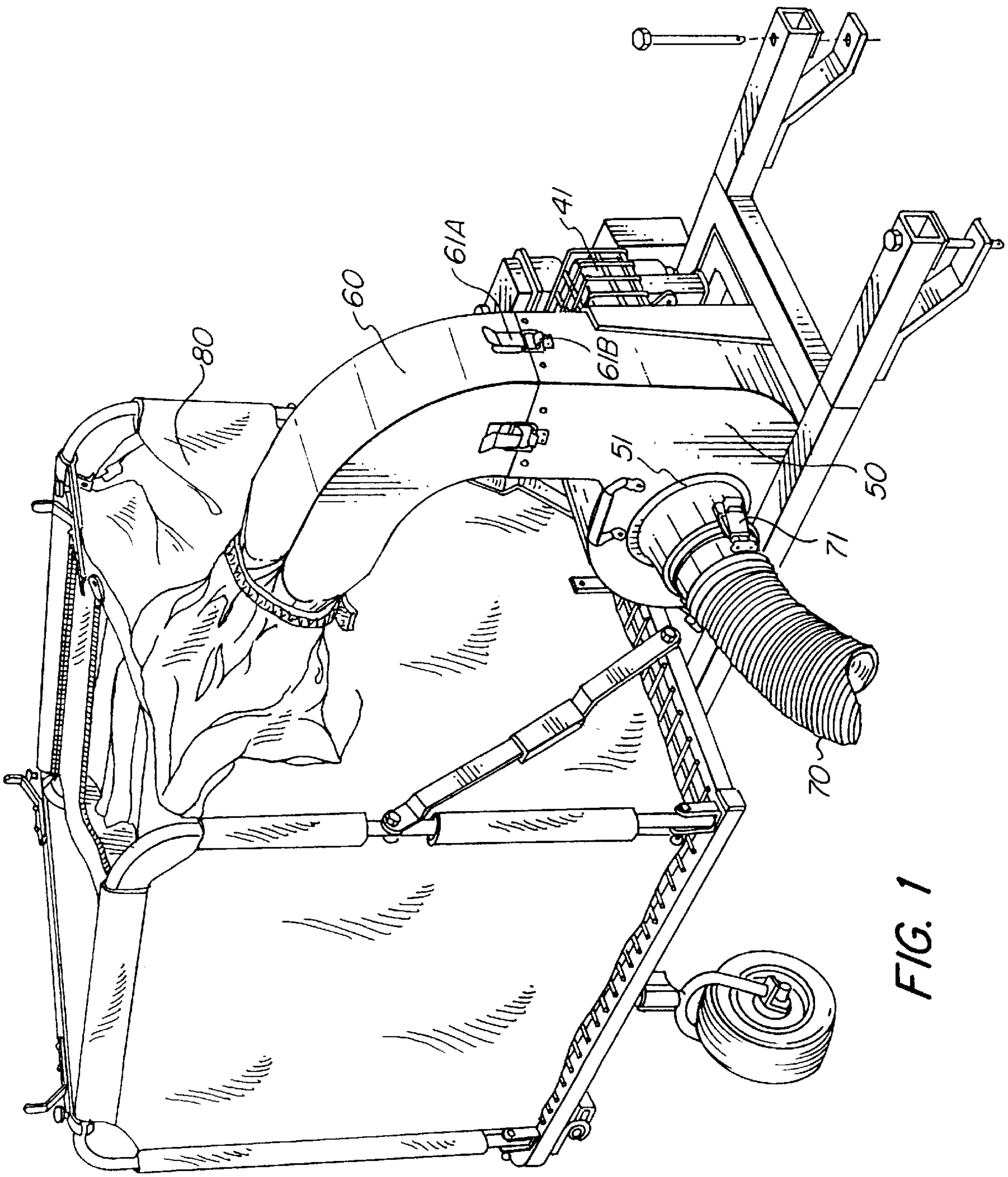
FIG. 1, a perspective depiction of the vacuum assembly and a means for collecting the organic material and hard objects blown through the outlet duct.
Figure 2:
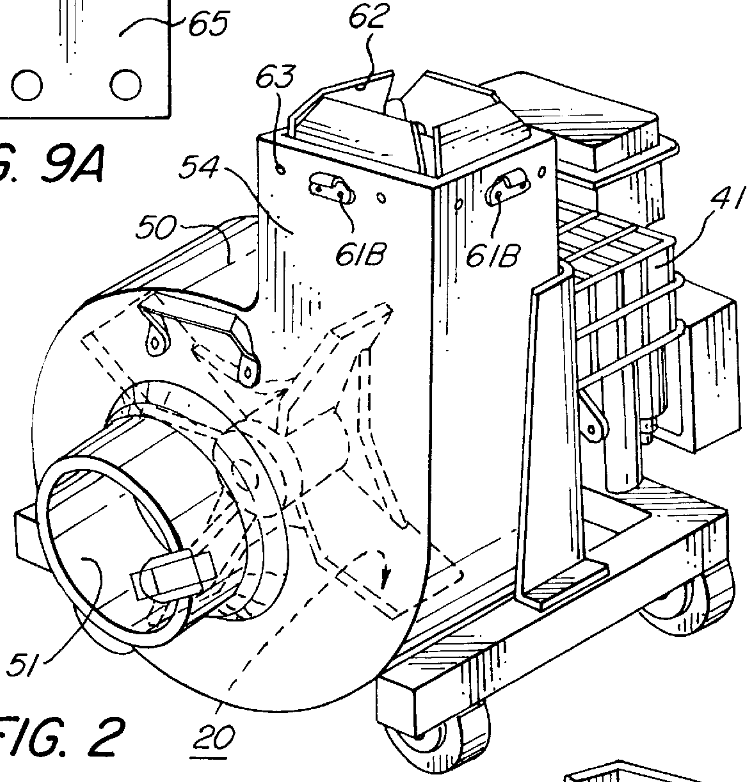
FIG. 2, a perspective view of the housing, motor, guide plates and impeller (shown as dashed lines) assembled together.
Figure 3:
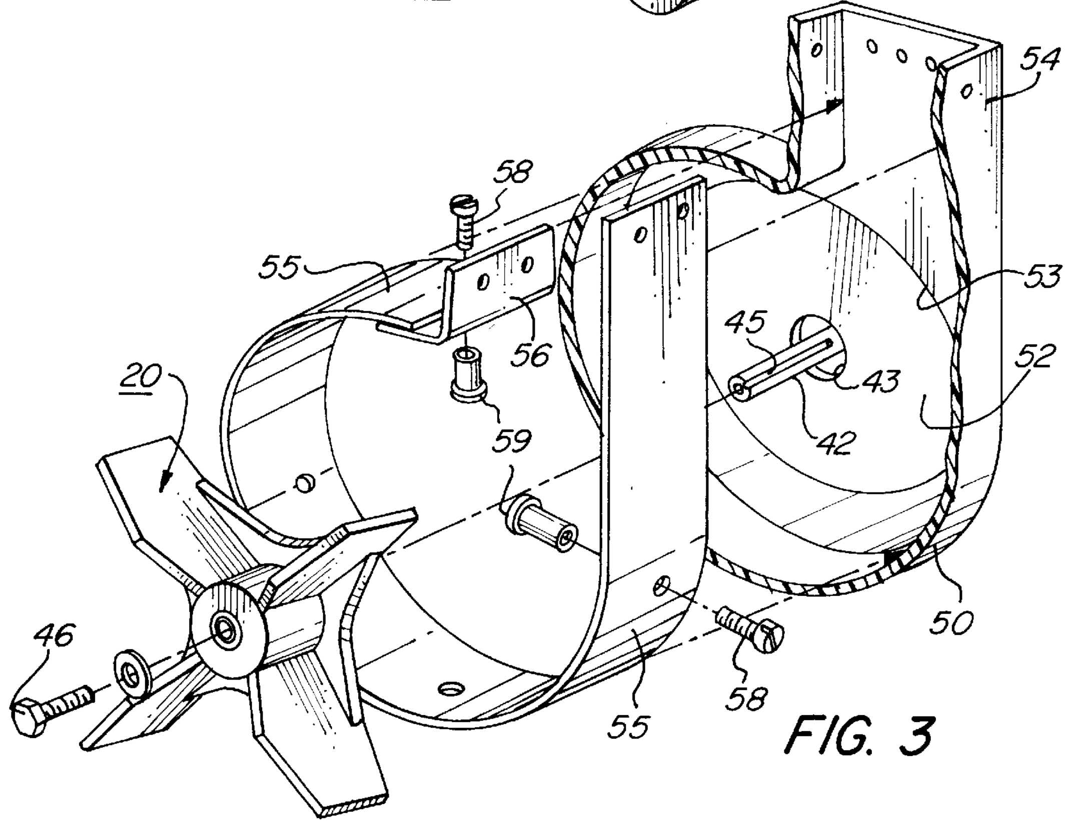
FIG. 3, an exploded perspective view of the impeller, protective sleeve, housing, drive shaft and access panel.
Figure 4:
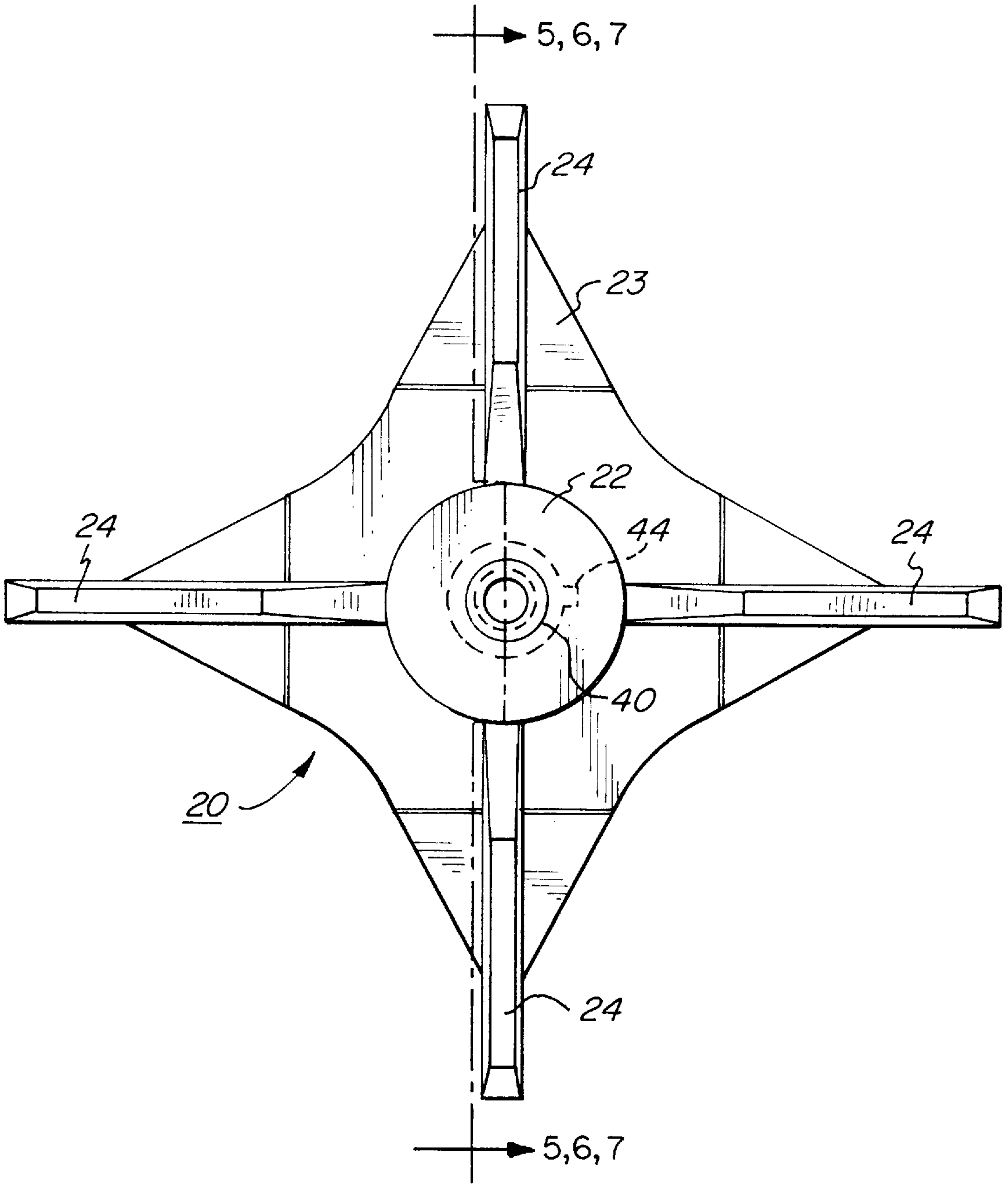
FIG. 4, a front view of the impeller.

The present invention may be used for generating a vacuum in order to move organic material. A preferred embodiment of the invention is described herein and shown in the drawings. FIG. 1 generally shows the present invention mounted on a trailer for pulling by a lawn tractor (shown in FIG. 14). In FIGS. 2 and 3 there is shown an impeller 20 disposed within a housing 50 according to the present invention. As described in more detail herein, the motor 41 rotates the impeller 20 so as to create a vacuum in the housing inlet 51 and a positive pressure inside the exit plenum section 54.

In FIGS. 4, 5, 6 and 7 there is shown a preferred embodiment of the impeller 20 of the present invention having a central axis B—B about which the impeller 20 rotates, having a blade hub 22, blade webs 23, blades 24, and steel drive shaft hub 40. The blade hub 22, blade webs 23 and blades 24 are herein collectively referred to as the "blade assembly". Each blade 24 has a base side edge 25 which is integrally joined to the blade web 23. The blade hub 22, blade webs 23, and blades 24 are molded as one piece from an elastomer, such as polyurethane, onto the drive shaft hub 40. The drive shaft hub 40 has a keyway 44 for mating with the drive shaft key 45 (shown in FIG. 3).

Figure 7:
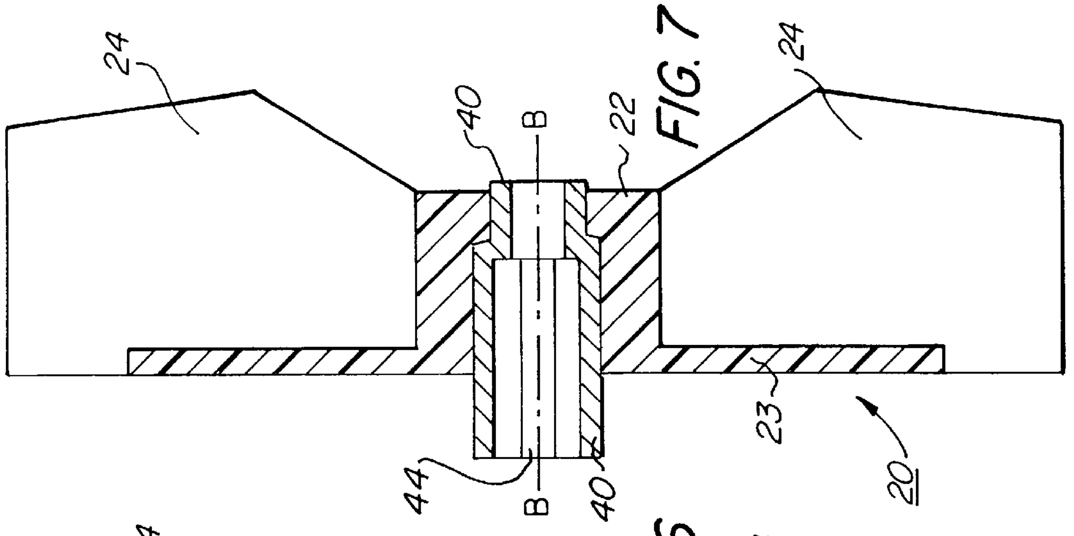
FIG. 7, a cross sectional side view taken along line A—A shown in FIG. 4 of the impeller when rotating about center line B—B.
Figure 6:
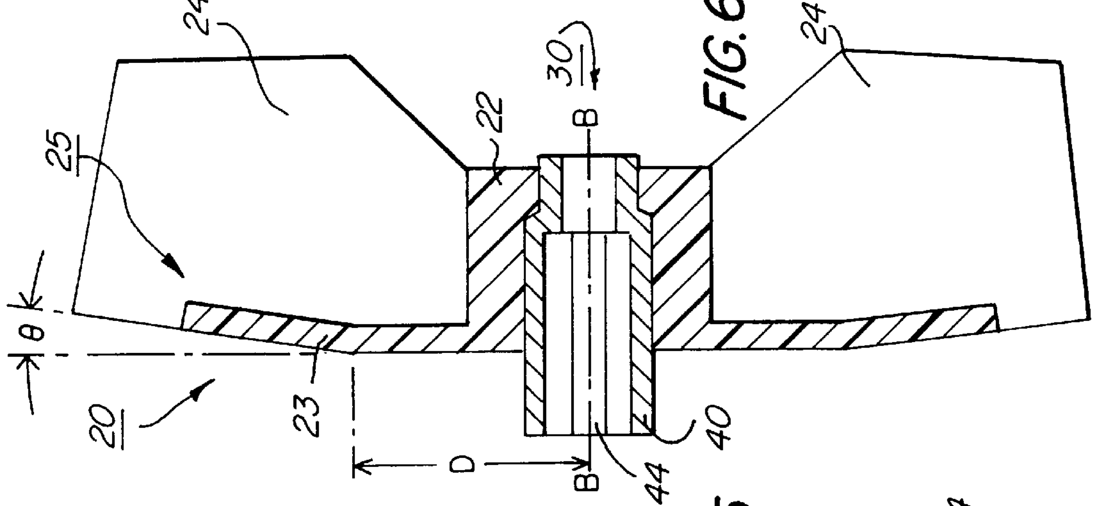
FIG. 6, a cross sectional side view taken along line A—A shown in FIG. 4 of the impeller at rest.
Figure 5:
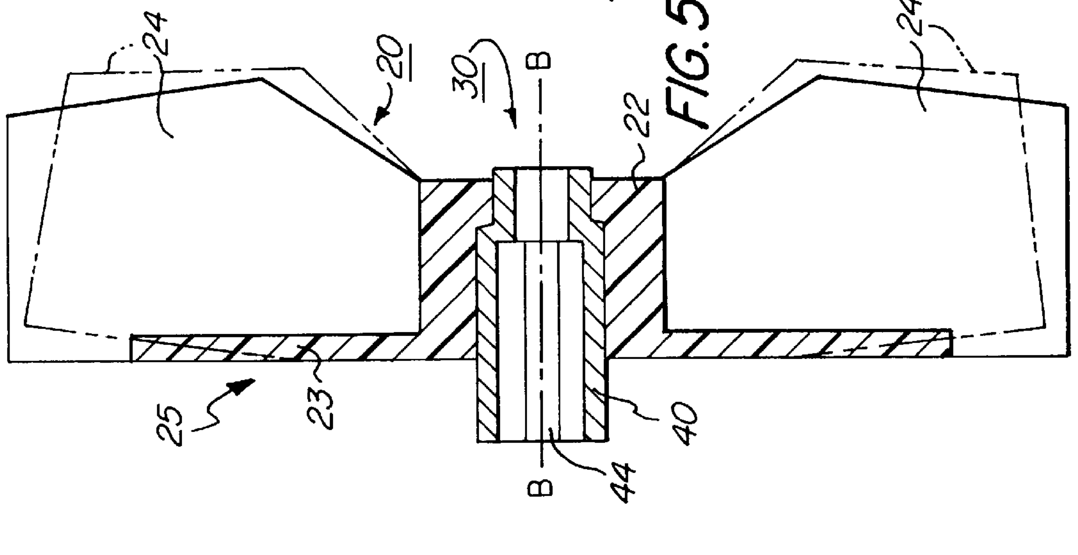
FIG. 5, a cross sectional side view of the impeller taken along line A—A shown in FIG. 4 showing how the impeller deforms from its stationary shape (shown by dashed lines) to a different shape (shown by solid lines) when the impeller is rotating.

As shown in FIGS. 5 and 6, the blade assembly is molded so that the base side edge 25 of the blades 24 and blade webs 23 connect with the blade hub 22 at an angle which is substantially perpendicular to the central axis B—B of the impeller 20. In a preferred embodiment shown in FIG. 6, at a distance D from the central axis B—B, the base side edge 25 of the blades 24 and blade webs 23 are curved toward the inlet side 30 of the impeller 20 at an average angle θ which is approximately 7 degrees. As shown in FIGS. 5, 6 and 7 when the impeller 20 is rotating about the central axis B—B, the elastomer blades 24 and blade webs 23 deflect such that the angle θ is substantially reduced toward zero. In this manner, the impeller achieves a shape when rotating which will not contact the housing 50 and resembles the shape commonly found in the prior art rigid impellers. If the impeller 20 were not curved toward the inlet side 30, the impeller 20 would contact the housing 50 while rotating. Such contact is not desirable because it will slow down and excessively wear the impeller, and may destroy the housing and/or motor. In the preferred embodiment mentioned above, the impeller, having a specific gravity equal to approximately 1.25 and durometer reading equal to 90 A, will deform at 3450 rpm so that θ is substantially reduced to zero.

Figure 8:
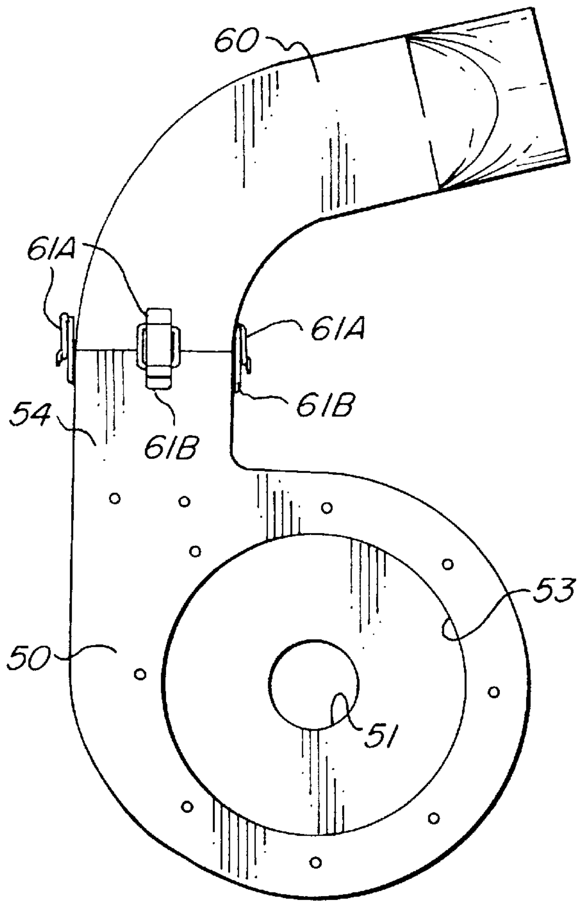
FIG. 8, a side view of the housing and outlet duct.
Figure 13:
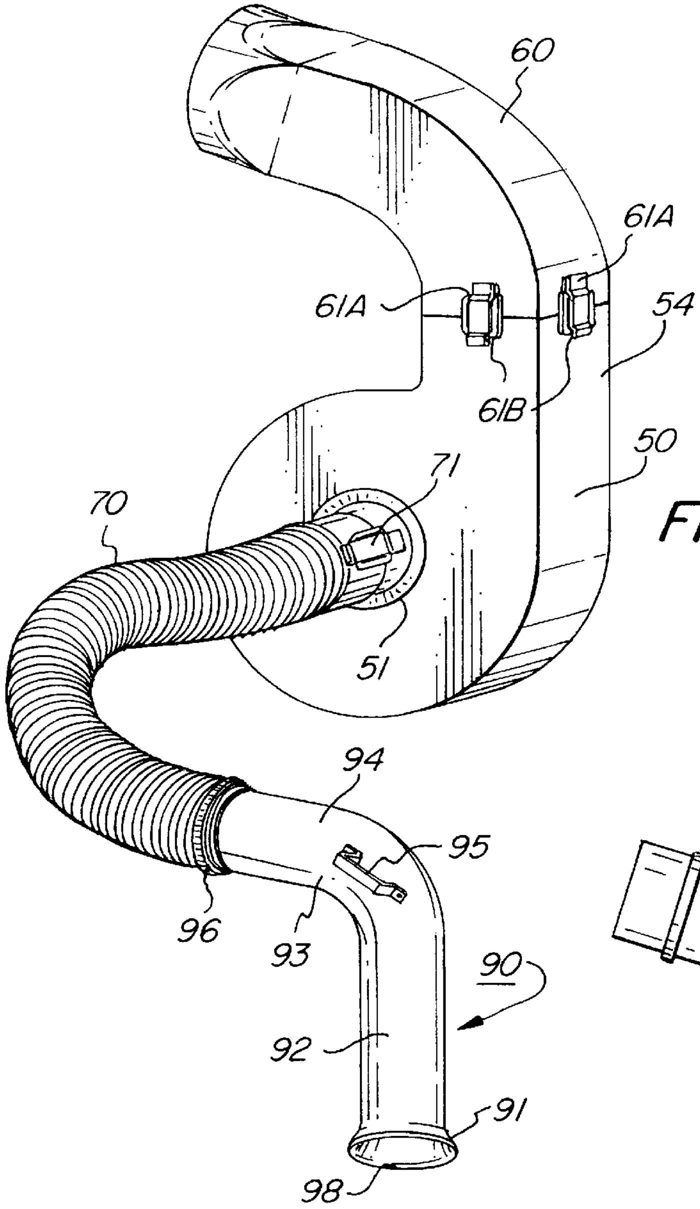
FIG. 13, a perspective depiction of the completed vacuum assembly.

FIG. 2 depicts the impeller 20 (shown by dashed lines) disposed within the housing 50. As shown in FIGS. 2, 8 and 13, the housing 50 has a generally cylindrical portion within which the impeller 20 and the protective sleeve, comprising a first part 55 and a second part 56 (shown in FIG. 3) are disposed. In this generally cylindrical portion, the housing 50 has therethrough an air inlet 51 and a large access port 53. The housing 50 also has a generally rectangular exit plenum section 54. The housing 50 is preferably made from high density polyethylene, in order to minimize the weight of the housing 50.

Between the housing 50 and the impeller 20, is a protective sleeve comprising a first part 55 and a second part 56 shown in FIG. 3. The protective sleeve is made preferably from steel and serves to protect the housing 50 from the impact of hard objects. Both the first 55 and second 56 parts of the protective sleeve are preferably secured to the housing 50 via eight (8) T-Nut assemblies 58 (two of which are shown in FIG. 3). As shown in FIG. 3, the T-Nut assemblies 58 are comprised of an internally threaded portion, having a low profile head 59, and an externally threaded portion. Although the protective sleeve may be constructed as one piece, it is preferable to construct it from two pieces because the second part 56 incurs significantly more impact and wear than the first part 55. By providing a two piece protective sleeve, if one part of the protective sleeve requires replacement, replacement costs are minimized.

As shown in FIGS. 1, 8 and 13, connected to the exit plenum section 54 is the outlet duct 60. The outlet duct 60 may be an integral extension of the exit plenum section 54, or in a preferred embodiment, the outlet duct 60 is removable from the housing 50. In the preferred embodiment, the outlet duct 60 is held to the exit plenum section 54 via the toggle latches 61A and toggle strikes 61B (see FIG. 2). The toggle latches 61A provide for quick removal and installation of the outlet duct 60, and when latched provide a firm connection of the outlet duct 60 to the exit plenum section 54.

Figure 9A:
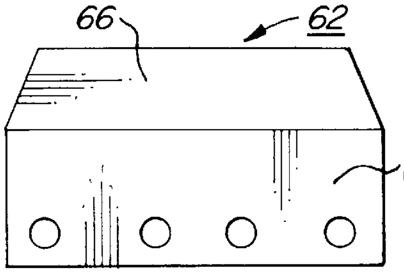
FIG. 9A and 9B, front and side views respectively of a guide plate, also shown in FIG. 2.
Figure 9B:
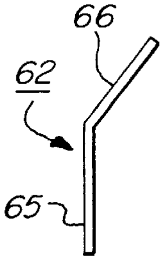

As shown in FIGS. 2, 9A and 9B, connected to the inside surface of the exit plenum section 54 are the guide plates 62. As shown in FIG. 9A, the guide plates 62 are comprised of a first planar section 65 and a second planar section 66. As shown in FIG. 9B, the second planar section 66 is angled with respect to the first planar section 65. When the guide plates 62 are attached to the exit plenum section 54, the first planar section 65 contacts and is connected to the exit plenum section 54, while the second planar section 66 protrudes from and is not in contact with, connected to, or disposed within the exit plenum section 54. It should be noted that, as shown in FIG. 2, it is preferable to have a portion of the first planar section 65, adjacent to the second planar section 66, which is not disposed within or in contact with the exit plenum section 54.

When installing the outlet duct 60 on the exit plenum section 54, the second planar section 66 of each guide plate 62 guides and deforms the outlet duct 60 into the proper position relative to the exit plenum section 54 so that the part of the exit plenum section 54 and the part of the outlet duct 60 which are in contact with one another have cross sections which are substantially similar. In this manner, imprecision in the molding process is corrected and a tight seal is formed between the outlet duct 60 and the exit plenum section 54. In addition, the guide plates 62 have the further purpose of holding the outlet duct 60 in the proper position while the toggle latches 61A are being latched to the toggle strikes 61B. At least two guide plates 62 are required, and preferably, there are four guide plates 62.

Figure 10:
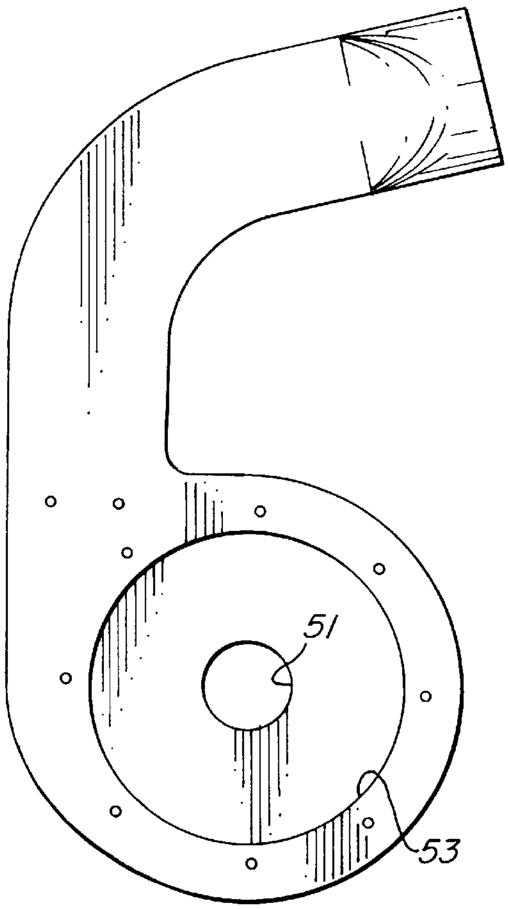
FIG. 10, a side view of the molded part which eventually becomes the housing and outlet duct.

In a preferred method of making the housing 50 and outlet duct 60, a single part (shown in FIG. 10) is molded preferably from high density polyethylene. Next, the molded part is cut to create two separate parts, the housing 50 and outlet duct 60. By this method, the part of the exit plenum section 54 and the part of the outlet duct 60 which contact one another are substantially the same shape. Next, the guide plates 62 are attached to the inside surface of the exit plenum section 54 by suitable connectors 63 (shown in FIG. 2). Finally, the toggle latches 61A and toggle strikes 61B are installed on the outside surface of the exit plenum section 54 and outlet duct 60.

Figure 12A:
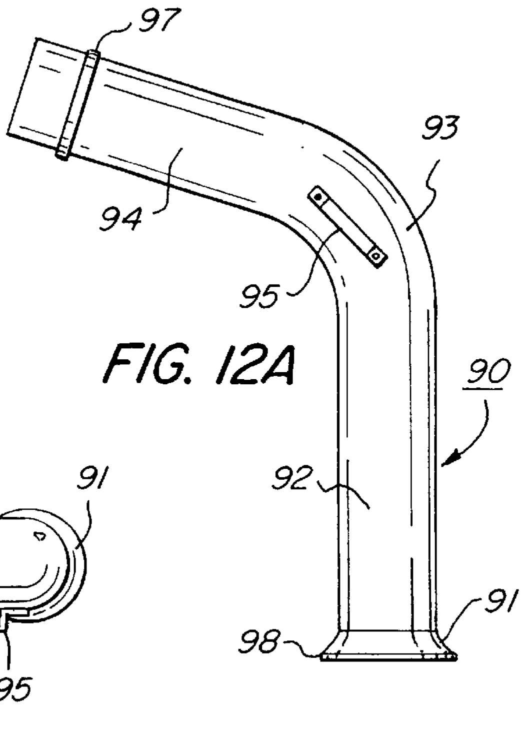
FIGS. 12A and 12B, side and top views respectively of the vacuum wand.
Figure 12B:
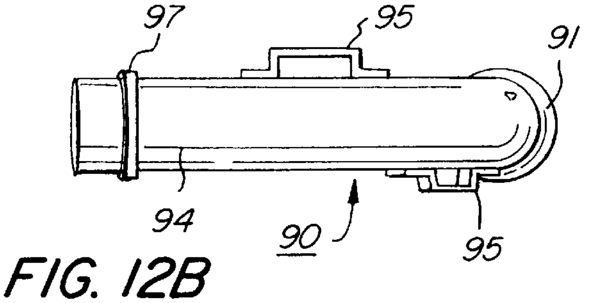

In an alternative embodiment of the present invention, a vacuum wand 90 shown in FIGS. 12A, 12B and 13 is attached to the inlet duct 70 in order to permit the user to vacuum organic material by hand. The vacuum wand 90 is comprised of a flared entrance bell 91, riser section 92, curved section 93, mating section 94, handles 95, collar 96 and a bead edge 97. The flared entrance 91 reduces the chance that sticks will be caught on the entrance edge 98, reduces dynamic pressure loss relative to an entrance edge which is not flared, and offers improved safety should the user's hand or arm get sucked against the entrance edge 98. The riser section 92 is preferably 18 inches in length in order to reduce the amount of bending required by the typical user to properly position the entrance edge 98 near organic material. The curved section 93 provides a transition between the riser section 92 and mating section 94, and reduces the amount of force required of the user in order to properly position the entrance edge 98 near organic material. The curved section 93 preferably sweeps an angle of 75 degrees. The mating section 94 provides a location for attaching the inlet duct 70 to the vacuum wand 90. The inlet duct 70 is held to the vacuum wand 90 by a removable collar 96. Finally, the bead edge 97 provides a seal between the mating section 94 and the inlet duct 70.

Figure 11:
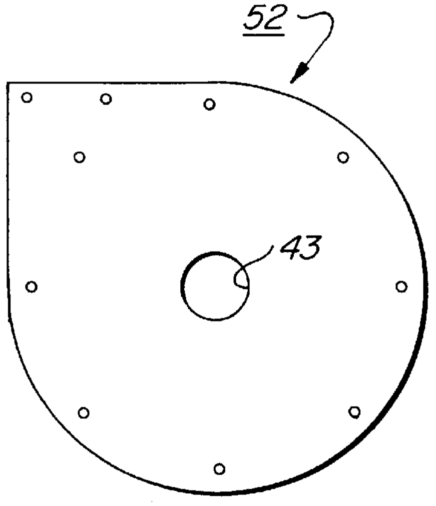
FIG. 11, a front view of the access panel used to cover the access port shown in FIG. 8.

A completed vacuum generation device according to the present invention (shown in FIG. 13) is achieved by inserting and securing the first part 55 and second part 56 of the protective sleeve into the housing 50 (see FIG. 2). Then, the impeller 20 is attached to the drive shaft 42 by a threaded bolt 46 which mates with internal threads within the drive shaft 42 (not shown). Next, the impeller 20 is inserted through the access port 53 (shown in FIGS. 2 and 8) and positioned within the protective sleeve. Then the access panel 52 (shown in FIG. 11) is slid over the drive shaft 42 and secured to the housing 50 by suitable means. Next, a motor 41 (shown in FIGS. 1 and 2) is connected to the drive shaft 42. Then, the outlet duct 60 is connected to the exit plenum section 54 via the toggle latches 61A. Finally, the inlet duct 70 is connected to the housing 50 at the housing inlet 51 via inlet latches 71 (shown in FIG. 1) and to the vacuum wand 90 via collar 96.

When the motor 41 is turned on, the drive shaft turns the impeller 20 thereby generating a vacuum in the inlet duct 70 and in the vacuum wand 90. The vacuum generated by the rotating impeller 20 causes organic material, air and hard objects located at the flared entrance 91 to travel through the vacuum wand 90 and the inlet duct 70 toward the impeller 20. The organic material, air and hard objects travel within the housing 50 to the exit plenum section 54 where the positive pressure generated by the rotating impeller 50 forces the air, organic material and hard objects through the exit plenum section 54 and finally through the outlet duct 60. Some organic material, leaves for example, will be chopped into mulch as it passes by the impeller 50. Other organic material and hard objects will travel through the housing without being significantly transformed. Due to the flexible nature of the elastomer impeller 20, the hard objects traveling through the housing 50 are not likely to damage the impeller 20 or wedge between the impeller 20 and the protective sleeve; instead, the impeller 20 flexes as needed to prevent damage or wedging.

It should be apparent to those skilled in the art that the light-weight impeller 20 of the present invention is less likely to require balancing than the prior art metal impellers. Indeed, if molded properly, no balancing should be required. Furthermore, if the impeller 20 of the present invention goes out of balance, it is less likely to damage the drive shaft 42 or motor 41 than its prior art metal counterparts.

The direction in which the air, organic material and hard objects are blown may be altered easily by releasing the toggle latches 61A, removing the outlet duct 60 from the exit plenum section 54, rotating the outlet duct 60 relative to exit plenum section 54 until the toggle latches 61A are in alignment with the toggle strikes 61B, replacing the outlet duct 60 on the exit plenum section 54, and latching the toggle latches 61A to secure the outlet duct 60 to the exit plenum section 54. It should be apparent from the foregoing description that the number of toggle strikes 61B determines the number of directions in which the organic material, air and hard objects can be blown.

Figure 14:
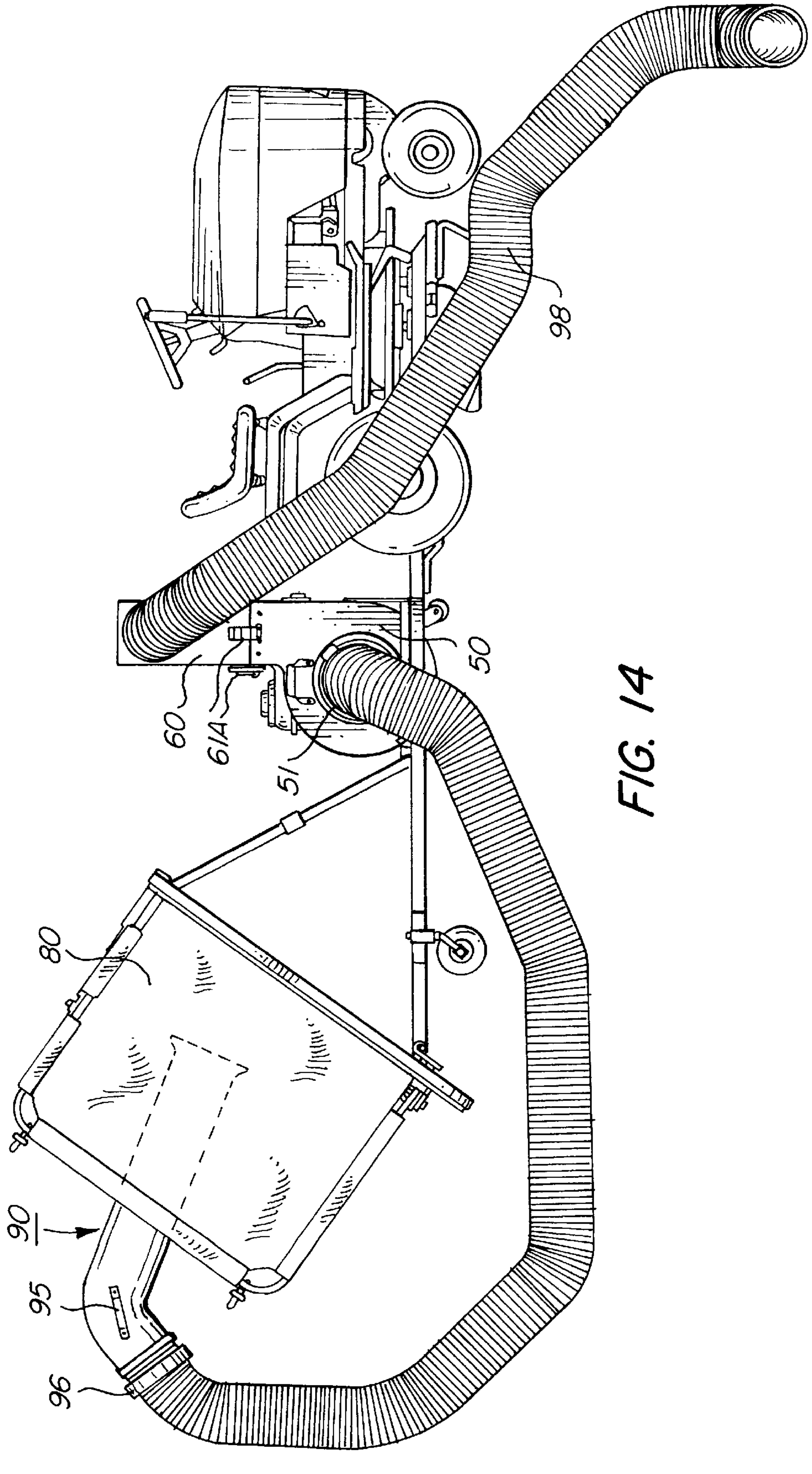
FIG. 14, a side view of the completed vacuum assembly arranged for unloading the container.

Usually, the outlet duct 60 is positioned on the exit plenum section 54 so that organic material is blown toward a collector 80 as shown in FIG. 1. However, as shown in FIG. 14, by rotating the outlet duct 60 as described above, the vacuum wand 90 can be used to remove the contents of the collector 80 and blow the contents to a desired location, for example down a hillside. Flexible hose 98 is attached to the outlet duct via suitable means and positioned to blow the contents of collector 80 to a desired location. The flexible hose 98 is preferably comprised of helical reinforcing wire encased within a transparent polymer. By arranging the present invention in this manner, the contents of the collector 80 can be blown to places where it would be difficult to place the collector 80 for unloading.

The invention described herein results in a vacuum generation device which achieves the objects set forth above. Due to the flexible nature of the impeller, hard objects sucked into the fan housing 50 are not likely to damage the impeller 20 or the fan housing 50. Also due to the flexible nature of the impeller, the large clearance space between the impeller blade tips and the housing/protective sleeve (incorporated into the prior art to prevent wedging) can be reduced, thereby increasing the vacuum provided by the device over prior art designs. Since the impeller is made from an elastomer, it is lighter than its metallic prior art counterparts. Due to the multiple toggle latches 61A and toggle strikes 61B, the outlet duct 60 provides a means for easily changing the direction in which organic material is blown. The vacuum wand 90, via its riser section 92, curved section 93 and mating section 94 reduces the bending required of the user to vacuum organic material, and thereby reduces back strain. Furthermore, the vacuum wand 90 via its flared entrance 91, reduces the chance that sticks will become caught on the entrance edge 98, and reduces the loss of vacuum associated with prior art hand-held tubes.

It will thus be seen that the objects set forth above, and those made apparent from the preceding description, are efficiently attained and, since certain changes may be made in carring out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. An apparatus for generating a vacuum comprising:

a housing having a housing inlet, a drive shaft port, and an exit plenum section;

an impeller rotatably mounted within a protective sleeve for drawing air therethrough and generating a vacuum at said housing inlet;

a means for rotating said impeller;

an inlet duct connected to said housing inlet for receiving and guiding material to be vacuumed;

an outlet duct installably connected to said exit plenum section for directing material vacuumed; and at least two guide plates connected to said exit plenum section for guiding said outlet duct during installation on said exit plenum section, and for deforming said outlet duct and said exit plenum section so as to render a portion of said exit plenum section and a portion of said outlet duct substantially similar in shape.

2. The apparatus of claim 1, further comprising at least two toggle latches for connecting said outlet duct to said exit plenum section.

3. The apparatus of claim 2, further comprising a flexible tube having two open ends, one of said ends being attached to said outlet duct and the other of said ends being capable of directing organic material to a desired location.

4. The apparatus of claim 1, further comprising a protective sleeve disposed within said housing for protecting said housing from objects moving through said housing.

5. The apparatus of claim 1, wherein said impeller is constructed from an elastomer.

6. A rotatable and deformable elastomer impeller, having an inlet side, and a central axis, comprising:

a hub symmetrically disposed about said central axis; and at least two blades connected to said hub and having a base side edge extending radially from said hub which curves from said hub toward said inlet side when said deformable impeller is not rotating and is not deformed.

7. The rotatable impeller of claim 6, further comprising a radially extending blade web joining said hub to said base side edges of said blades for providing rigidity to said elastomer impeller and for radially diverting air propelled by said impeller.

8. The impeller of claim 7, wherein said elastomer is polyurethane.

9. An apparatus for generating a vacuum comprising:

a housing having a housing inlet, a drive shaft port, and an exit plenum section;

an elastomer impeller rotatably mounted within said housing for drawing air therethrough and generating a vacuum at said housing inlet;

a means for rotating said impeller;

an inlet duct connected to said housing inlet for guiding air and material to be vacuumed into said housing; and a vacuun wand connected to said inlet duct for receiving air and material to be vacuumed, wherein said vacuum wand has a flared entrance, the flared entrance having a bell-shaped longitudinal cross section.

10. The apparatus of claim 9, wherein said impeller has a base side and an inlet side, and further comprises at least two blades having a base side edge extending radially from said hub which curves from said hub toward the inlet side of said impeller when said impeller is not rotating.

11. The apparatus of claim 10, further comprising a blade web joining said base side edges of said blades for providing rigidity to said elastomer impeller.

12. The apparatus of claim 11, wherein said elastomer is polyurethane.

13. The apparatus of claim 12, further comprising an outlet duct installably connected to said exit plenum section for directing air and material vacuumed.

14. The apparatus of claim 13, further comprising:

at least two toggle latches for connecting said outlet duct to said exit plenum section; and at least two guide plates connected to said exit plenum section for guiding said outlet duct during installation on said exit plenum section, and for deforming said outlet duct and said exit plenum section so as to render a portion of said exit plenum section and a portion of said outlet duct substantially similar in shape.

15. The apparatus of claim 14, further comprising a protective sleeve disposed within said housing for protecting said housing from objects moving through said housing.

16. An apparatus for generating a vacuum comprising:

a housing having a housing inlet, a drive shaft port, and an exit plenum section;

an impeller rotatably mounted within said housing for generating a vacuum at an inlet of said impeller;

a means for rotating said impeller;

an inlet duct connected to said housing inlet for guiding material to be vacuumed; and a vacuum wand connected to said inlet duct for receiving material to be vacuumed, wherein said vacuum wand has a riser section and a flared entrance, the riser section having a smooth interior surface blending with the interior flared surface of the flared entrance which terminates in a smooth convex bell-shaped curve facing outward and defining its longitudinal cross-section, whereby the flared entrance successfully vacuums up organic material and sticks from the ground, avoiding snagging or catching forked and crooked sticks in a stepped or inflected horn entrance, and reduces dynamic pressure loss in the air stream entering the flared entrance.

17. The apparatus of claim 16, wherein said vacuum wand further comprises a curved section adjacent to said riser section, and a mating section adjacent to said curved section for attaching to said inlet duct.

18. The apparatus of claim 17, wherein said mating section has a bead edge for providing a seal between said mating section and said inlet duct.

19. An apparatus for generating a vacuum comprising:

a housing having a housing inlet, a drive shaft port, and an exit plenum section;

an impeller rotatably mounted within said housing for generating a vacuum at an inlet of said impeller;

a means for rotating said impeller;

an inlet duct connected to said housing inlet for guiding material to be vacuumed; and a vacuum wand connected to said inlet duct for receiving material to be vacuumed, wherein said vacuum wand has a riser section and a flared entrance, the riser section having a smooth interior surface blending with the interior flared surface of the flared entrance which terminates in a smooth convex bell-shaped curve facing outward and defining its longitudinal cross-section, wherein said vacuum wand further comprises a curved section adjacent to said riser section, and a mating section adjacent to said curved section for attaching to said inlet duct, and wherein said mating section has a bead edge for providing a seal between said mating section and said inlet duct.

20. The apparatus of claim 19, further comprising an outlet duct connected to said exit plenum section for directing material vacuumed; and at least two guide plates connected to said exit plenum section for guiding said outlet duct during installation on said exit plenum section, and for deforming said outlet duct and said exit plenum section so as to render a portion of said exit plenum section and a portion of said outlet duct substantially similar in shape.

21. The apparatus of claim 20, wherein said impeller is formed from an elastomer.

* * * * *